(12) United States Patent
Li et al.

(10) Patent No.: US 12,278,680 B2
(45) Date of Patent: Apr. 15, 2025

(54) CHANNEL STATE INFORMATION REFERENCE SIGNAL TRANSMISSION METHOD AND APPARATUS

(71) Applicant: ZTE Corporation, Shenzhen (CN)

(72) Inventors: Yong Li, Shenzhen (CN); Hao Wu, Shenzhen (CN); Zhaohua Lu, Shenzhen (CN); Yuxin Wang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 330 days.

(21) Appl. No.: 17/796,752

(22) PCT Filed: Mar. 23, 2021

(86) PCT No.: PCT/CN2021/082386
§ 371 (c)(1),
(2) Date: Aug. 1, 2022

(87) PCT Pub. No.: WO2021/203961
PCT Pub. Date: Oct. 14, 2021

(65) Prior Publication Data
US 2024/0030976 A1    Jan. 25, 2024

(30) Foreign Application Priority Data
Apr. 10, 2020    (CN) .......................... 202010281611.3

(51) Int. Cl.
*H04B 7/06*    (2006.01)
(52) U.S. Cl.
CPC .................. *H04B 7/0626* (2013.01)
(58) Field of Classification Search
CPC ..... H04B 7/0626; H04L 5/005; H04L 5/0094; H04L 5/0039; H04L 5/001; H04L 5/0023;
(Continued)

(56) References Cited

U.S. PATENT DOCUMENTS

2016/0029238 A1 * 1/2016 Chen ..................... H04W 76/27
370/252
2016/0094326 A1    3/2016 Moon et al.
(Continued)

FOREIGN PATENT DOCUMENTS

CN        102763391 A    10/2012
CN        104938006 A     1/2013
(Continued)

OTHER PUBLICATIONS

Supplementary European Search Report for U.S. Appl. No. 21/784,018, dated Mar. 27, 2024, 2 pages.
(Continued)

*Primary Examiner* — Tejis Daya
(74) *Attorney, Agent, or Firm* — CANTOR COLBURN LLP

(57) ABSTRACT

Provided in embodiments of the present disclosure are a Channel State Information Reference Signal (CSI-RS) transmission method and apparatus. The method includes: configuration information is transmitted to a terminal, the configuration information including the number of Resource Blocks (RB) in an A-type RB group, and the A-type RB group comprises consecutive RBs for carrying all ports of CSI-RS; and the CSI-RS is transmitted to the terminal according to the configuration information. The present disclosure can solve the problem in the related art that system complexity is increased due to the unfixed number of antenna ports for the CSI-RS, and reduce the system complexity by transmitting the CSI-RS by means of the configuration information that includes the number of RBs included in the A-type RB group, and the A-type RB group comprises the consecutive RBs for carrying all the ports of the CSI-RS.

18 Claims, 2 Drawing Sheets

Configuration information is transmitted to a terminal, the configuration information including the number of RBs in an A-type RB group, and the A-type RB group comprises consecutive RBs for carrying all ports of CSI-RS — S202

The CSI-RS is transmitted to the terminal according to the configuration information — S204

(58) Field of Classification Search
CPC ............ H04L 5/0048; H04W 72/0446; H04W 72/046
See application file for complete search history.

(56) References Cited

U.S. PATENT DOCUMENTS

| | | |
|---|---|---|
| 2016/0337178 A1 | 11/2016 | Frenne et al. |
| 2018/0287754 A1* | 10/2018 | Xu ........................ H04L 5/0048 |
| 2019/0109761 A1* | 4/2019 | Frenne ................ H04L 41/0803 |
| 2019/0116075 A1* | 4/2019 | Li ........................ H04L 5/0026 |
| 2022/0278726 A1* | 9/2022 | Wu ........................ H04L 5/0051 |
| 2023/0013510 A1* | 1/2023 | Ge ........................ H04L 5/0094 |

FOREIGN PATENT DOCUMENTS

| | | |
|---|---|---|
| CN | 106656292 A | 5/2017 |
| CN | 108631994 A | 10/2018 |
| CN | 111865544 A | 10/2020 |
| WO | 2011120224 A1 | 10/2011 |
| WO | 2015101150 A1 | 7/2015 |
| WO | 2017136068 A1 | 8/2017 |
| WO | 2018171687 A1 | 9/2018 |
| WO | WO-2021081964 A1 * | 5/2021 ........... H04B 7/0456 |

OTHER PUBLICATIONS

International Search Report for corresponding application PCT/CN2021/082386 filed Mar. 23, 2021; Mail date Jun. 21, 2021.
LG Electronics, "Discussion on non-precoded CSI-RS-based scheme enhancements", 3GPP TSG RAN WG1 Meeting #80bis, Belgrade, Serbia, Apr. 20-24, 2015, R1-151533.

* cited by examiner

CHANNEL STATE INFORMATION REFERENCE SIGNAL TRANSMISSION METHOD AND APPARATUS

CROSS-REFERENCE TO RELATED APPLICATION

The present disclosure claims priority to Chinese Patent Application No. CN202010281611.3, filed on Apr. 10, 2020, and entitled "Channel State Information Reference Signal Transmission Method and Apparatus", the disclosure of which is hereby incorporated by reference in its entirety.

TECHNICAL FIELD

The present disclosure relates to the field of communications, and in particular to a channel state information reference signal transmission method and apparatus.

BACKGROUND

Wireless communications provide convenience and improve efficiency for human life and production. The 5th Generation New Radio (5G NR) wireless communication network is designed based on an Orthogonal Frequency Division Multiplex (OFDM) symbol technology. In a time domain unit structure for wireless communication network transmission using the OFDM technology, a certain number of OFDM symbols form a time slot, and a certain number of time slots form a wireless frame. In a frequency domain unit structure for transmission, a certain number of sub-carriers form a Resource Block (RB). In the process of wireless communication network transmission, a wireless communication system may develop a transmission strategy according to Channel State Information (CSI). As the performance of the wireless communication system is improved, so is its complexity.

A Channel State Information Reference Signal (CSI-RS) is transmitted through an antenna port and carried on a CSI-RS resource. The number of antenna ports for the CSI-RS is not a fixed number. In some scenarios, a large number of antenna ports are required, while in others, a small number of antenna ports are required. Using one RB to carry all antenna ports for the CSI-RS and meeting the requirements on the number of antenna ports from small to large increases system complexity. For example, when the number of antenna ports for the CSI-RS is small, reference signal resources bearing the antenna ports occupy fewer wireless resources; on the contrary, when the number of antenna ports for the CSI-RS is large, the reference signal resources bearing the antenna ports occupy more wireless resources; while the wireless resources need to carry other wireless signals, so the complexity of coordinating the resources occupied by the CSI-RS and other wireless signals is increased.

For the problem in the related art that system complexity is increased due to the unfixed number of antenna ports for a CSI-RS, no solution has been proposed.

SUMMARY

Embodiments of the present disclosure provide a CSI-RS transmission method and apparatus to at least solve the problem in the related art that system complexity is increased due to the unfixed number of antenna ports for a CSI-RS.

According to an embodiment of the present disclosure, a CSI-RS transmission method is provided, which may include the following steps: configuration information is transmitted to a terminal. The configuration information includes the number of RBs in an A-type RB group, and the A-type RB group comprises consecutive RBs for carrying all ports of CSI-RS; and the CSI-RS is transmitted to the terminal according to the configuration information.

According to another embodiment of the present disclosure, a CSI-RS transmission method is also provided, which may include the following steps: configuration information is received. The configuration information includes the number of RBs in the A-type RB group, and the A-type RB group comprises the consecutive RBs for carrying all the ports of the CSI-RS; and the CSI-RS is received according to the configuration information.

According to another embodiment of the present disclosure, a CSI-RS transmission apparatus is also provided, which may include: a first transmission module and a second transmission module.

The first transmission module is configured to transmit the configuration information to the terminal. The configuration information includes the number of RBs in the A-type RB group, and the A-type RB group comprises the consecutive RBs for carrying all the ports of the CSI-RS.

The second transmission module is configured to transmit the CSI-RS to the terminal according to the configuration information.

According to another embodiment of the present disclosure, a CSI-RS transmission apparatus is also provided, which may include: a first receiving module and a second receiving module.

The first receiving module is configured to receive the configuration information. The configuration information includes the number of RBs in the A-type RB group, and the A-type RB group comprises the consecutive RBs for carrying all the ports of the CSI-RS.

The second receiving module is configured to receive the CSI-RS according to the configuration information.

According to yet another embodiment of the present disclosure, a computer-readable storage medium is also provided, in which a computer program is stored. The computer program is configured to execute, when running, the steps in any of the above method embodiments.

According to yet another embodiment of the present disclosure, an electronic device is also provided, which may include a memory and a processor. The memory stores a computer program. The processor is configured to run the computer program to execute the steps in any of the above method embodiments.

Through the embodiments of the present disclosure, in which configuration information is transmitted, the configuration information including the number of RBs in an A-type RB group, and the A-type RB group comprises consecutive RBs for carrying all ports of CSI-RS, and the CSI-RS is transmitted to the terminal according to the configuration information, the problem in the related art that system complexity is increased due to the unfixed number of antenna ports for the CSI-RS can be solved, and the system complexity is reduced by transmitting the CSI-RS by means of the configuration information that includes the number of RBs included in the A-type RB group, and the A-type RB group comprises the consecutive RBs for carrying all the ports of the CSI-RS.

DETAILED DESCRIPTION OF THE EMBODIMENTS

The present disclosure is elaborated below with reference to the accompanying drawings and embodiments.

It is to be noted that the terms like "first" and "second" in the specification, claims and accompanying drawings of the present disclosure are used for differentiating the similar objects, but do not have to describe a specific order or a sequence.

Embodiment 1

Figure 1:
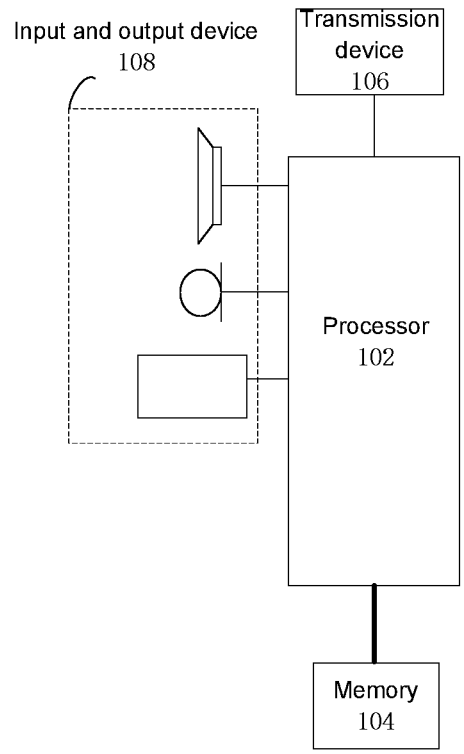
FIG. 1 is a structure diagram of hardware of a mobile terminal for a CSI-RS transmission method according to an embodiment of the present disclosure.

A method embodiment provided in embodiment 1 of the present application may be applied to a base station side or a terminal side in a wireless communication network. The method may be executed in a base station or mobile terminal, and a computer terminal or similar computing devices. Taking that the method is executed in a mobile terminal as an example, FIG. 1 is a structure diagram of hardware of a mobile terminal for a CSI-RS transmission method according to an embodiment of the present disclosure. As shown in FIG. 1, the mobile terminal may include one or more (only one is shown in FIG. 1) processors 102 (the processor 102 may include, but not limited to, a Micro Processor Unit (MCU) or a Field Programmable Gate Array (FPGA), and other processing devices), a memory 104 for storing data. Optionally, the mobile terminal may also include a transmission device 106 for a communication function and an input and output device 108. Those of ordinary skill in the art should know that the structure shown in FIG. 1 is only schematic and not intended to limit the structure of the mobile terminal. For example, the mobile terminal may also include more or less components than that in FIG. 1, or has a configuration different from that in FIG. 1.

The memory 104 may be configured to store a computer program, for example, a software program and module of application software, for example, a computer program corresponding to the BFD parameter negotiation method in the embodiments of the present disclosure. The processor 102 runs the computer program stored in the memory 104, thereby executing various functional applications and data processing, namely implementing the above method. The memory 104 may include a high-speed random access memory and may also include a nonvolatile memory, for example, one or more magnetic storage devices, flash memories or other nonvolatile solid-state memories. In some examples, the memories 104 may further include memories remotely set relative to the processor 102, and these remote memories may be connected to the mobile terminal through the network. An example of the network includes, but not limited to, the Internet, an Intranet, a local area network, a mobile communication network and a combination thereof.

The transmission device 106 is configured to receive or send data through a network. A specific example of the network may include a wireless network provided by a communication provider of the mobile terminal. In an example, the transmission device 106 includes a Network Interface Controller (NIC), which may be connected with other network devices through a base station, thereby communicating with the Internet. In an example, the transmission device 106 may be a Radio Frequency (RF) module, which is configured to communicate with the Internet in a wireless manner.

Figure 2:
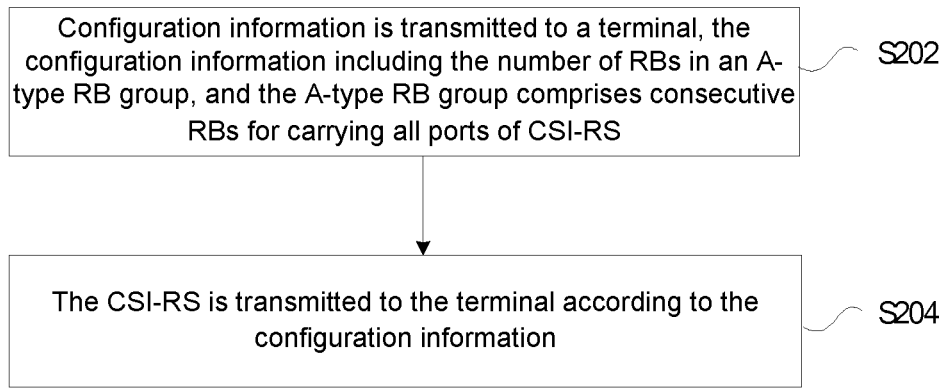
FIG. 2 is a first flowchart of a CSI-RS transmission method according to an embodiment of the present disclosure.

Based on the base station or the mobile terminal mentioned above, a CSI-RS transmission method is provided in the present embodiment. FIG. 2 is a first flowchart of a CSI-RS transmission method according to an embodiment of the present disclosure. As shown in FIG. 2, the flow includes the following steps.

At S202, configuration information is transmitted to a terminal, the configuration information including the number of RBs in an A-type RB group, and the A-type RB group comprises consecutive RBs for carrying all ports of CSI-RS.

At S204, the CSI-RS is transmitted to the terminal according to the configuration information.

Through S202 and S204, the problem in the related art that system complexity is increased due to the unfixed number of antenna ports for the CSI-RS can be solved, and the system complexity is reduced by transmitting the CSI-RS by means of the configuration information that includes the number of RBs included in the A-type RB group, and the A-type RB group comprises the consecutive RBs for carrying all the ports of the CSI-RS.

The A-type RB group is a RB combination composed of the consecutive RBs carrying the CSI-RS, and all the ports of the CSI-RS appear only once in the RB combination.

All the ports appear only once in the RB combination composed of the consecutive RBs carrying the CSI-RS, and the RB combination is denoted as A-type RB group. The number of RBs included in the A-type RB group is the number of RBs for carrying all the ports of the CSI-RS. The number of RBs for carrying all the ports of the CSI-RS is how many RBs are used to carry all the ports of the CSI-RS, that is, how many RBs can be used to carry all the ports of the CSI-RS. In an example, the CSI-RS is carried on 12 RBs, and the CSI-RS has 8 ports. Every two consecutive RBs carrying the CSI-RS carry all the 8 ports of the CSI-RS, that is, the A-type RB group consists of two RBs. In a situation, the RBs in the A-type RB group are consecutive. As shown in Table 1, a A-type RB group marked as A-type RB group 0 includes four RBs, which are RB 0, RB 1, RB 2 and RB 3 respectively. There are no other RBs among the four RBs.

TABLE 1

RB 0 in A-type RB group 0
RB 1 in A-type RB group 0
RB 2 in A-type RB group 0
RB 3 in A-type RB group 0

In an option, the RBs in the A-type RB group are inconsecutive. As shown in Table 2, a A-type RB group marked as A-type RB group 0 includes two RBs, which are RB 0 and RB 1 respectively. There are other RBs among the two RBs.

TABLE 2

| |
| --- |
| RB 0 in A-type RB group 0 |
| RB in non-A-type RB group 0 |
| RB 1 in A-type RB group 0 |

In another option, the A-type RB groups are consecutive. As shown in Table 3, there are two A-type RB groups, which are denoted as group 0 and group 1 respectively. There are no other RBs between the two groups.

TABLE 3

| |
| --- |
| RB 0 in A-type RB group 0 |
| RB 1 in A-type RB group 0 |
| RB 0 in A-type RB group 1 |
| RB 1 in A-type RB group 1 |

In yet another option, the A-type RB groups are inconsecutive. As shown in Table 4, there are two A-type RB groups, which are denoted as group 0 and group 1 respectively. There are RBs of non-A-type RB group between the two groups.

TABLE 4

| |
| --- |
| RB 0 in A-type RB group 0 |
| RB 1 in A-type RB group 0 |
| RB in non-A-type RB group |
| RB in non-A-type RB group |
| RB 0 in A-type RB group 1 |
| RB 1 in A-type RB group 1 |

By indicating the number of RBs included in the A-type RB group in the configuration information, the requirement on the changeable number of ports for transmitting the CSI-RS is met, and the requirement for occupying the wireless resources to transmit other wireless signals is coordinated. The number of antenna ports a RB can carry is limited. One case is that the maximum number of ports of the CSI-RS that a RB can carry is limited, for example, the maximum number of ports in the current NR system is 32. Another case is that due to carrying other wireless signals, the number of antenna ports a RB can carry is limited.

The configuration information includes the number of RBs carrying all the ports of the CSI-RS, which may be indicated explicitly or implicitly. For example, the number of RBs included in the A-type RB group is directly indicated, for example, the number of RBs included in the A-type RB group is indicated as two. For example, the number of ports carrying the CSI-RS and carried by a RB is indicated as Kp, and the number of ports of the CSI-RS is indicated as N. The number of RBs included in the A-type RB group may be obtained by dividing Kp by N.

In an embodiment, the configuration information is further used for indicating one of the following states of the A-type RB group: the RBs in the A-type RB group are consecutive; the RBs in the A-type RB group are inconsecutive; the A-type RB groups are consecutive; and the A-type RB groups are inconsecutive.

Further, the configuration information also includes density information of the CSI-RS. The density information of the CSI-RS is used for indicating one of the following states of the A-type RB group: the RBs in the A-type RB group are consecutive; the RBs in the A-type RB group are inconsecutive; the A-type RB groups are consecutive; and the A-type RB groups are inconsecutive.

For example, the density value of the CSI-RS is 1, indicating that the A-type RB groups carrying the CSI-RS are consecutive, or indicating that the RBs in the A-type RB group are consecutive; the density value of the CSI-RS is less than 1, indicating that the A-type RB groups are inconsecutive, or indicating that the RBs in the A-type RB group are inconsecutive.

For another example, the density value of the CSI-RS is 1, indicating that the A-type RB groups are consecutive, and the RBs in the A-type RB group are consecutive; the density value of the CSI-RS is less than 1, indicating that the A-type RB groups are inconsecutive, and the RBs in the A-type RB group are consecutive.

The information includes that the density of the CSI-RS is the density value of each port of each RB. The information includes that the density of the CSI-RS may be expressed as the ratio of the number of RBs occupied by each port to the number of RBs in a frequency domain range of transmitting the CSI-RS. For example, the information includes that the density of the CSI-RS is 0.5, indicating that the density value of each port of each RB is 0.5.

Corresponding to the density value of the CSI-RS, there may be many ways for the CSI-RS to occupy the wireless resources. If these ways need a base station or terminal to store or retrieve, the system complexity is increased undoubtedly. The density of the CSI-RS corresponds to or indicates the above limited state, which is beneficial to transmit the CSI-RS using the wireless resources and reduces the system complexity.

That the RBs in the A-type RB group are consecutive means that there are no other RBs between adjacent RBs in the A-type RB group. That the A-type RB groups are consecutive means there are no other RBs between adjacent A-type RB groups.

In another embodiment, the A-type RB groups are equal in spacing or equal in position difference in frequency domain range of transmitting the CSI-RS.

The A-type RB groups are equal in spacing in the frequency domain range of transmitting the CSI-RS, that is, the spacing between the adjacent A-type RB groups in frequency domain is equal, or the position difference between the adjacent A-type RB groups in frequency domain is equal.

For example, the spacing distance between the adjacent A-type RB groups in frequency domain is zero RB. For another example, the spacing distance between the adjacent A-type RB groups in frequency domain is one RB. For another example, the spacing distance between the adjacent A-type RB groups in frequency domain is two RBs.

For another example, the spacing distance between the adjacent A-type RB groups in frequency domain is the size of zero A-type RB group. For another example, the spacing distance between the adjacent A-type RB groups in frequency domain is the size of one A-type RB group. For another example, the spacing distance between the adjacent A-type RB groups in frequency domain is the size of two A-type RB groups.

The CSI-RS is transmitted on the A-type RB groups, and the A-type RB groups are equal in spacing in the frequency domain range of transmitting the CSI-RS, so that adjacent frequency domain positions of each port are equal in spacing, the spacing distances between adjacent frequency domain positions of all ports are equal, and the frequency domain positions between the ports are concentrated. In this way, a channel error caused by a large difference in frequency domain position between the ports is avoided, and the system complexity is reduced.

In another embodiment, the configuration information also includes the density of the A-type RB group which is indicated explicitly or implicitly in the configuration information. Further, the density of the A-type RB group is used for indicating that the A-type RB groups are consecutive or inconsecutive in the frequency domain range of transmitting the CSI-RS.

Further, the density of the A-type RB group is indicated in one of the following ways:
  indicating the number of the A-type RB groups in the frequency domain range of transmitting the CSI-RS;
  indicating the number of the A-type RB groups which are averaged to a predetermined number of frequency domain units;
  indicating a difference in frequency domain position between the adjacent A-type RB groups;
  indicating a spacing distance in frequency domain between the adjacent A-type RB groups;
  indicating that every M frequency domain RBs have one A-type RB group, M being a positive integer; and
  indicating that on average, there are N A-type RB groups in the frequency domain range of the size of each A-type RB group, N being a real number.

The density of the A-type RB group shows the degree of density of the A-type RB group in the frequency domain range of transmitting the CSI-RS. The indication of the density of the A-type RB group in the configuration information indicates the importance of the transmitted CSI-RS to channel measurement. The high density of the A-type RB group indicates that the system has increased the importance of the transmitted CSI-RS, and the terminal should increase the frequency of measurement on frequencies to improve the performance. The low density of the A-type RB group indicates that the system has reduced the importance of the transmitted CSI-RS, and the terminal should reduce the frequency of measurement on frequencies to reduce the workload. Indicating the density of the A-type RB group in the configuration information facilitates the terminal in receiving the transmitted CSI-RS using density information and reduces the complexity of blink detection. A method for indicating the density of the A-type RB group is indicating the number of the A-type RB groups in the frequency domain range of transmitting the CSI-RS. Another method for indicating the density of the A-type RB group is indicating the number of the A-type RB groups averaged to a frequency domain unit. Another method for indicating the density of the A-type RB group is indicating the difference in frequency domain position between the adjacent A-type RB groups.

Another method for indicating the density of the A-type RB group is indicating the spacing distance in frequency domain between the adjacent A-type RB groups. Another method for indicating the density of the A-type RB group is indicating that every M frequency domain RBs form an A-type RB group, M being a positive integer. Another method for indicating the density of the A-type RB group is indicating that there are N A-type RB groups in the frequency domain range with the size of each A-type RB group, N being a real number.

Further, the density of the A-type RB group is indicated by indicating the number of the A-type RB groups in the frequency domain range of transmitting the CSI-RS. If the density of the A-type RB group is greater than or equal to a preset threshold, the A-type RB groups are consecutive in the frequency domain range of transmitting the CSI-RS. If the density of the A-type RB group is less than the preset threshold, the A-type RB groups are inconsecutive in the frequency domain range of transmitting the CSI-RS.

The A-type RB group may be presented in many modes in the frequency domain range of transmitting the CSI-RS, which will increase the system complexity. For example, the base station or terminal is required to store these presentation modes and corresponding processing modes and prepare the processing capacity of these modes. Dividing the A-type RB groups into consecutive and inconsecutive in the frequency domain range of transmitting the CSI-RS reduces the number of presentation modes of the A-type RB group in the frequency domain range of transmitting the CSI-RS. Indicating whether the A-type RB groups are consecutive in the frequency domain range of transmitting the CSI-RS is helpful for the terminal to receive the transmitted CSI-RS and reducing the complexity of receiving operation of the terminal. Indicating through the density of the A-type RB group whether the A-type RB groups are consecutive in the frequency domain range of transmitting the CSI-RS may save signaling overhead and indicate whether the A-type RB groups are consecutive in the frequency domain range of transmitting the CSI-RS, thereby reducing the system complexity. An indicating way is that the density of the A-type RB group is greater than or equal to a threshold value (namely the preset threshold value), indicating that the A-type RB groups are consecutive in the frequency domain range of transmitting the CSI-RS. Another indicating way is that the density of the A-type RB group is less than or equal to a threshold value, indicating that the A-type RB groups are inconsecutive in the frequency domain range of transmitting the CSI-RS.

In another embodiment, groups of ports of the CSI-RS correspond to the RBs in the A-type RB group one by one.

The CSI-RS is carried on the A-type RB group, and the ports of the CSI-RS are divided into X group, X being the number of RBs included in the A-type RB group. The groups of ports correspond to the RBs in the A-type RB group one by one, that is, one group of ports is carried by one corresponding RB in the A-type RB group.

For example, the number of RBs included in the A-type RB group is two, and the ports of the CSI-RS are divided into two groups. The first group of ports are carried on one RB in the A-type RB group, and the second group of ports are carried on another RB in the A-type RB group. For another example, the number of RBs included in the A-type RB group is three, and the ports of the CSI-RS are divided into three groups. The first group of ports are carried on one RB in the A-type RB group, the second group of ports are carried on another RB in the A-type RB group, and the third group of ports are carried on yet another RB in the A-type RB group.

According to the RBs in the A-type RB group, the ports of the CSI-RS are grouped, and each group of ports are carried on the corresponding RB, which facilitates a transmitting side in transmitting the CSI-RS on each port according to the RBs, and facilitates a receiving side in detecting the CSI-RS on each port according to the RBs, thereby reducing the system complexity.

Further, the groups of ports correspond to the RBs in the A-type RB group in one of the following ways:
  the sequence number of port of the CSI-RS corresponds to the sequence number of the RB in the A-type RB group;
  the sequence number of port of the CSI-RS corresponds to the frequency of the RB in the A-type RB group, specifically, according to the sequence number of port and the frequency of the RB in the A-type RB group; and the ports with the same remainder which is obtained by dividing the sequence number of port of the CSI-RS by the number of RBs in the A-type resource block group; specifically, the ports are divided into X groups, and the ports with the same remainder of the sequence number of port belong to the same group, the remainder being obtained by dividing the sequence number of port by the number of RBs in the A-type RB group, the sequence number of port being dividend, and the number of the RBs in the A-type RB group being divisor.

For example, the sequence numbers of the ports in an ascending order correspond to the sequence numbers of the RBs in the A-type RB group in an ascending order, that is, the group of ports with small sequence numbers correspond to the RBs with small sequence numbers in the A-type RB group, and the group of ports with large sequence numbers correspond to the RBs with large sequence numbers in the A-type RB group. For example, the A-type RB group includes two RBs, which are RB 0 and RB 1 respectively; the ports are divided into two groups, the group 0 of ports include port 0 and port 1, and the group 1 of ports include port 2 and port 3; the group 0 of ports correspond to the RB 0, and the group 1 of ports correspond to the RB 1.

For another example, the sequence numbers of the ports in an ascending order correspond to the sequence numbers of the RBs in the A-type RB group in a descending order, that is, the group of ports with small sequence numbers correspond to the RBs with large sequence numbers in the A-type RB group, and the group of ports with large sequence numbers correspond to the RBs with small sequence numbers in the A-type RB group. For example, the A-type RB group includes two RBs, which are RB 0 and RB 1 respectively; the ports are divided into two groups, the group 0 of ports include port 0 and port 1, and the group 1 of ports include port 2 and port 3; the group 0 of ports correspond to the RB 1, and the group 1 of ports correspond to the RB 2.

That the sequence numbers of the ports correspond to the sequence numbers of the RBs in the A-type RB group provides the flexibility of corresponding relationship and thus reduces the complexity of corresponding relationship.

For example, the sequence numbers of the ports in an ascending order correspond to the frequencies of the RBs in the A-type RB group in an ascending order, that is, the group of ports with small sequence numbers correspond to the RBs with low frequencies in the A-type RB group, and the group of ports with large sequence numbers correspond to the RBs with high frequencies in the A-type RB group. For example, the A-type RB group includes two RBs, which are RB 0 and RB 1 respectively, the frequency domain position of the RB 0 being lower than that of the RB 1; the ports are divided into two groups, the group 0 of ports include port 0 and port 1, and the group 1 of ports include port 2 and port 3; the group 0 of ports correspond to the RB 0, and the group 1 of ports correspond to the RB 1.

For another example, the sequence numbers of the ports in an ascending order correspond to the frequencies of the RBs in the A-type RB group in a descending order, that is, the group of ports with small sequence numbers correspond to the RBs with high frequencies in the A-type RB group, and the group of ports with large sequence numbers correspond to the RBs with low frequencies in the A-type RB group. For example, the A-type RB group includes two RBs, which are RB 0 and RB 1 respectively, the frequency domain position of the RB 0 being lower than that of the RB 1; the ports are divided into two groups, the group 0 of ports include port 0 and port 1, and the group 1 of ports include port 2 and port 3; the group 0 of ports correspond to the RB 1, and the group 1 of ports correspond to the RB 2.

Based on that the sequence numbers of the ports correspond to the order of frequency domain positions of the RBs in the A-type RB group, a corresponding relationship with the group of ports may be established using the existing the order of frequency domain positions of the RBs, thereby reducing the system complexity.

For example, the number of the RBs in the A-type RB group is two, the ports are grouped according to a remainder obtained by dividing the sequence number of port by two, a group of ports with a remainder of 0 are carried by one RB in the A-type RB group, and a group of ports with a remainder of 1 are carried by another RB in the A-type RB group.

For another example, the number of the RBs in the A-type RB group is three, the ports are grouped according to a remainder obtained by dividing the sequence number of port by three, a group of ports with a remainder of 0 are carried by one RB in the A-type RB group, a group of ports with a remainder of 1 are carried by another RB in the A-type RB group, and a group of ports with a remainder of 2 are carried by one remaining RB in the A-type RB group.

Based on that the remainder of the sequence number of port corresponds to the RB in the A-type RB group, adjacent ports may easily be assigned to different RBs, and each RB in the A-type RB group carries as similar number of antenna ports as possible, thereby reducing the system complexity.

In another embodiment, the configuration information further includes: a B-type frequency domain width, which is used for indicating the number of RBs included in the A-type RB group. The B-type frequency domain width includes one of the following: a frequency domain width of CSI fed back by the terminal; a frequency domain width of the CSI-RS; and a frequency domain width of a bandwidth part of a system.

The base station transmits the CSI-RS, and the terminal measures the CSI-RS and then feeds back the CSI. Under the condition that certain detection performance is guaranteed, the number of RBs included in the A-type RB group is determined by the bandwidth of the detected CSI-RS. The frequency domain width of the CSI fed back by the terminal is the bandwidth of the actually detected CSI-RS. The frequency domain width of the CSI-RS indicates the bandwidth of the detected CSI-RS. The frequency domain width of a bandwidth part of the system is the bandwidth of the CSI-RS that may be detected. The configuration information further includes the a B-type frequency domain width. Indicating implicitly the number of RBs included in the A-type RB group using the B-type frequency domain width may reduce the signaling overhead and reduce the system complexity. The number of RBs included in the A-type RB group increases with the B-type frequency domain width, for example, stepwise. For another example, the number of RBs included in the A-type RB group is indicated jointly by the B-type frequency domain width and the number of ports of the CSI-RS carried by a single RB. For example, if the number of ports of the CSI-RS carried by a single RB increases, the number of RBs included in the A-type RB group decreases.

Further, the B-type frequency domain width is further used jointly with an adjustment coefficient for indicating the number of RBs included in the A-type RB group. The adjustment coefficient is used for adjusting the number of RBs included in the A-type RB group. Specifically, the number of RBs included in the A-type RB group is indicated jointly by the B-type frequency domain width and the adjustment coefficient. The adjustment coefficient is used for adjusting the number of RBs included in the A-type RB group to control measurement performance using the reference signal, thereby reducing the system complexity under the condition that the measurement performance is guaranteed. For example, the number of RBs included in the A-type RB group and the adjustment coefficient are in a monotone relationship, for example, monotonically increasing or monotonically decreasing. For example, the configuration information includes the adjustment coefficient.

In another embodiment, the configuration information further includes a pre-coded frequency domain granularity fed back by the terminal which is indicated, specifically implicitly, by the number of RBs included in the A-type RB group.

Further, the pre-coded frequency domain granularity is indicated by the number of RBs included in the A-type RB group in one of the following ways:

the pre-coded frequency domain granularity is a multiple of the number of RBs included in the A-type RB group;
the pre-coded frequency domain granularity is equal to the number of RBs included in the A-type RB group;
the pre-coded frequency domain granularity is determined jointly by the number of RBs included in the A-type RB group and the density of the CSI-RS; and
a corresponding relationship between the pre-coded frequency domain granularity and the number of RBs included in the A-type RB group.

The base station transmits the CSI-RS, and the terminal measures the CSI-RS and then feeds back the CSI. The CSI fed back includes pre-coded information applied to the antenna port. The pre-coded information is presented in a certain frequency domain unit, that is, in a certain frequency domain granularity, that is, the pre-coded value in the frequency domain range. For example, the pre-coded frequency domain granularity is an integral multiple of the number of RBs included in the A-type RB group. For another example, the pre-coded frequency domain granularity is the number of RBs included in the A-type RB group. For another example, the pre-coded frequency domain granularity is determined jointly by the number of RBs included in the A-type RB group and the density of the CSI-RS. For another example, the pre-coded frequency domain granularity monotonically increases with the number of RBs included in the A-type RB group, and monotonically decreases with the density of the CSI-RS.

In another embodiment, the configuration information further includes a frequency domain range of the CSI fed back by the terminal. A sub-band is used as the frequency domain granularity to represent the frequency domain range of the CSI, and the number of the A-type RB groups included in the sub-band is an integer.

That is, the configuration information further includes the frequency domain range of the CSI fed back by the terminal. A sub-band is used as the frequency domain granularity to represent the frequency domain range of the CSI, and the sub-band includes an integral number of A-type RB groups. The sub-band includes an integral number of A-type RB groups and facilitates channel state measurement in the sub-band and avoids measurement across the sub-bands, thereby reducing the system complexity. For example, one sub-band includes one A-type RB group. For another example, one sub-band includes two A-type RB groups. For another example, one sub-band includes three A-type RB groups.

Embodiment 2

Figure 3:
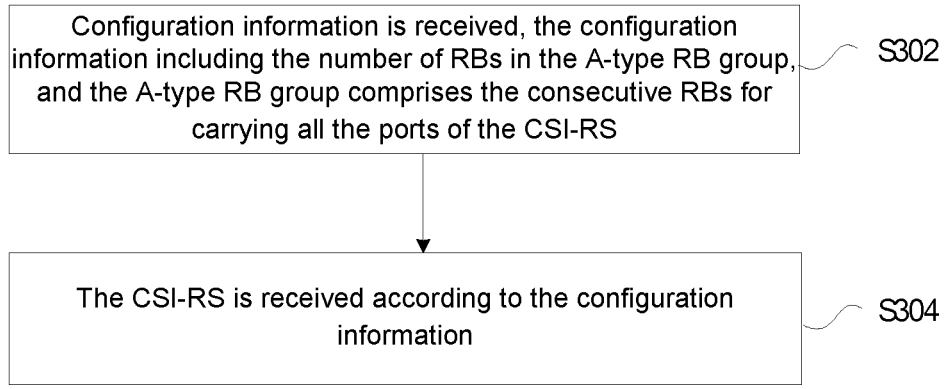
FIG. 3 is a second flowchart of a CSI-RS transmission method according to an embodiment of the present disclosure.

According to another aspect of the embodiments of the present disclosure, a CSI-RS transmission method is also provided. FIG. 3 is a second flowchart of a CSI-RS transmission method according to an embodiment of the present disclosure. As shown in FIG. 3, the method includes the following steps.

At S302, configuration information is received, the configuration information including the number of RBs in the A-type RB group, and the A-type RB group comprises the consecutive RBs for carrying all the ports of the CSI-RS.

At S304, the CSI-RS is received according to the configuration information.

The configuration information from the base station is received, and the CSI-RS is received according to the configuration information. The configuration information includes the number of RBs in an A-type RB group. The A-type RB group is a RB combination composed of the consecutive RBs carrying the CSI-RS, and all the ports of the CSI-RS appear only once in the RB combination.

Through S302 and S304, the problem in the related art that system complexity is increased due to the unfixed number of antenna ports for the CSI-RS can be solved, and the system complexity is reduced by transmitting the CSI-RS by means of the configuration information that includes the number of RBs included in the A-type RB group, and the A-type RB group comprises the consecutive RBs for carrying all the ports of the CSI-RS.

In an embodiment, the configuration information is further used for indicating one of the following states of the A-type RB group:

the RBs in the A-type RB group are consecutive;
the RBs in the A-type RB group are inconsecutive;
the A-type RB groups are consecutive; and
the A-type RB groups are inconsecutive.

In an embodiment, the configuration information further includes the density information of the CSI-RS. The density information of the CSI-RS is used for indicating one of the following states of the A-type RB group:

the RBs in the A-type RB group are consecutive;
the RBs in the A-type RB group are inconsecutive;
the A-type RB groups are consecutive; and
the A-type RB groups are inconsecutive.

In an embodiment, the A-type RB groups are equal in spacing or equal in position difference in the frequency domain range of transmitting the CSI-RS.

In an embodiment, the configuration information also includes the density of the A-type RB group which is indicated explicitly or implicitly in the configuration information.

In an embodiment, the density of the A-type RB group is indicated in one of the following ways:

indicating the number of the A-type RB groups in the frequency domain range of transmitting the CSI-RS;
indicating the number of the A-type RB groups which are averaged to a predetermined number of frequency domain units;
indicating a difference in frequency domain position between the adjacent A-type RB groups;
indicating a spacing distance in frequency domain between the adjacent A-type RB groups;
indicating that every M frequency domain RBs have one A-type RB group, M being a positive integer; and
indicating that on average, there are N A-type RB groups in the frequency domain range of the size of each A-type RB group, N being a real number.

In an embodiment, the density of the A-type RB group is used for indicating that the A-type RB groups are consecutive or inconsecutive in the frequency domain range of transmitting the CSI-RS.

In an embodiment, the density of the A-type RB group is indicated by indicating the number of the A-type RB groups in the frequency domain range of transmitting the CSI-RS. If the density of the A-type RB group is greater than or equal to a preset threshold, the A-type RB groups are consecutive in the frequency domain range of transmitting the CSI-RS. If the density of the A-type RB group is less than the preset threshold, the A-type RB groups are inconsecutive in the frequency domain range of transmitting the CSI-RS.

In an embodiment, the groups of ports of the CSI-RS correspond to the RBs in the A-type RB group one by one.

In an embodiment, the groups of ports correspond to the RBs in the A-type RB group in one of the following ways:
- the sequence number of port of the CSI-RS corresponds to the sequence number of the RB in the A-type RB group;
- the sequence number of port of the CSI-RS corresponds to the frequency of the RB in the A-type RB group;
- the ports with the same remainder obtained by dividing the sequence number of port of the CSI-RS by the number of the RBs in the A-type RB group belong to the same group.

In an embodiment, the configuration information further includes the B-type frequency domain width, which is used for indicating the number of RBs included in the A-type RB group. The B-type frequency domain width includes one of the following:
- the frequency domain width of the CSI fed back by the terminal;
- the frequency domain width of the CSI-RS; and
- the frequency domain width of the bandwidth part of the system.

In an embodiment, the B-type frequency domain width is further used jointly with the adjustment coefficient for indicating the number of RBs included in the A-type RB group. The adjustment coefficient is used for adjusting the number of RBs included in the A-type RB group.

In an embodiment, the configuration information further includes a pre-coded frequency domain granularity fed back by the terminal which is indicated by the number of RBs included in the A-type RB group.

In an embodiment, the pre-coded frequency domain granularity is indicated by the number of RBs included in the A-type RB group in one of the following ways:
- the pre-coded frequency domain granularity is a multiple of the number of RBs included in the A-type RB group;
- the pre-coded frequency domain granularity is equal to the number of RBs included in the A-type RB group;
- the pre-coded frequency domain granularity is determined jointly by the number of RBs included in the A-type RB group and the density of the CSI-RS; and
- the corresponding relationship between the pre-coded frequency domain granularity and the number of RBs included in the A-type RB group.

In an embodiment, the configuration information further includes the frequency domain range of the CSI fed back by the terminal. A sub-band is used as the frequency domain granularity to represent the frequency domain range of the CSI, and the number of the A-type RB groups included in the sub-band is an integer.

Through the above description of implementation modes, those skilled in the art may clearly know that the method according to the above embodiments may be implemented by means of software plus a necessary common hardware platform, certainly by means of hardware; but in many cases, the former is the better implementation. Based on this understanding, the technical solution of the present disclosure substantially or the part making a contribution to the conventional art can be embodied in the form of software product; the computer software product is stored in a storage medium (for example, a Read-Only Memory (ROM)/Random Access Memory (RAM), a magnetic disk, and a compact disc) and includes a number of instructions to make a computer device (which can be a personal computer, a server or a network device, etc.) perform all or part of the method in each embodiment of the present disclosure.

Embodiment 3

The present embodiment also provides a CSI-RS transmission apparatus, which is configured to implement the above embodiments and preferred implementations. The embodiments which have been elaborated will not be repeated here. The term "module" used below can realize a combination of software and/or hardware with an intended function. Although the device described in the following embodiment is realized through software better, the realization through hardware or a combination of software and hardware is possible and conceived.

Figure 4:
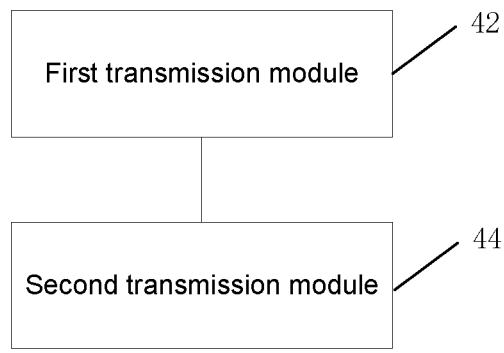
FIG. 4 is a first block diagram of a CSI-RS transmission apparatus according to an embodiment of the present disclosure.

FIG. 4 is a first block diagram of a CSI-RS transmission apparatus according to an embodiment of the present disclosure. As shown in FIG. 4, the apparatus may include: a first transmission module 42 and a second transmission module 44.

The first transmission module 42 is configured to transmit the configuration information. The configuration information includes the number of RBs in the A-type RB group, and the A-type RB group comprises the consecutive RBs for carrying all the ports of the CSI-RS.

The second transmission module 44 is configured to transmit the CSI-RS to the terminal according to the configuration information.

The configuration information is further used for indicating one of the following states of the A-type RB group:
- the RBs in the A-type RB group are consecutive;
- the RBs in the A-type RB group are inconsecutive;
- the A-type RB groups are consecutive; and
- the A-type RB groups are inconsecutive.

In an embodiment, the configuration information also includes the density information of the CSI-RS. The density information of the CSI-RS is used for indicating one of the following states of the A-type RB group:
- the RBs in the A-type RB group are consecutive;
- the RBs in the A-type RB group are inconsecutive;
- the A-type RB groups are consecutive; and
- the A-type RB groups are inconsecutive.

In another embodiment, the A-type RB groups are equal in spacing or equal in position difference in the frequency domain range of transmitting the CSI-RS.

In another embodiment, the configuration information also includes the density of the A-type RB group which is indicated explicitly or implicitly in the configuration information.

In another embodiment, the density of the A-type RB group is indicated in one of the following ways:
- indicating the number of the A-type RB groups in the frequency domain range of transmitting the CSI-RS;
- indicating the number of the A-type RB groups which are averaged to a predetermined number of frequency domain units;

indicating a difference in frequency domain position between the adjacent A-type RB groups;

indicating a spacing distance in frequency domain between the adjacent A-type RB groups;

indicating that every M frequency domain RBs have one A-type RB group, M being a positive integer; and indicating that on average, there are N A-type RB groups in the frequency domain range of the size of each A-type RB group, N being a real number.

In another embodiment, the density of the A-type RB group is used for indicating that the A-type RB groups are consecutive or inconsecutive in the frequency domain range of transmitting the CSI-RS.

In another embodiment the density of the A-type RB group is indicated by indicating the number of the A-type RB groups in the frequency domain range of transmitting the CSI-RS. If the density of the A-type RB group is greater than or equal to a preset threshold, the A-type RB groups are consecutive in the frequency domain range of transmitting the CSI-RS. If the density of the A-type RB group is less than the preset threshold, the A-type RB groups are inconsecutive in the frequency domain range of transmitting the CSI-RS.

In another embodiment, groups of ports of the CSI-RS correspond to the RBs in the A-type RB group one by one.

In another embodiment, the groups of ports correspond to the RBs in the A-type RB group in one of the following ways:

the sequence number of port of the CSI-RS corresponds to the sequence number of the RB in the A-type RB group;

the sequence number of port of the CSI-RS corresponds to the frequency of the RB in the A-type RB group;

the ports with the same remainder obtained by dividing the sequence number of port of the CSI-RS by the number of the RBs in the A-type RB group belong to the same group.

In another embodiment, the configuration information further includes the B-type frequency domain width, which is used for indicating the number of RBs included in the A-type RB group. The B-type frequency domain width includes one of the following:

the frequency domain width of the CSI fed back by the terminal;

the frequency domain width of the CSI-RS; and the frequency domain width of the bandwidth part of the system.

In another embodiment, the B-type frequency domain width is further used jointly with an adjustment coefficient for indicating the number of RBs included in the A-type RB group. The adjustment coefficient is used for adjusting the number of RBs included in the A-type RB group.

In another embodiment, the configuration information further includes a pre-coded frequency domain granularity fed back by the terminal which is indicated by the number of RBs included in the A-type RB group.

In another embodiment, the pre-coded frequency domain granularity is indicated by the number of RBs included in the A-type RB group in one of the following ways:

the pre-coded frequency domain granularity is a multiple of the number of RBs included in the A-type RB group;

the pre-coded frequency domain granularity is equal to the number of RBs included in the A-type RB group;

the pre-coded frequency domain granularity is determined jointly by the number of RBs included in the A-type RB group and the density of the CSI-RS; and the corresponding relationship between the pre-coded frequency domain granularity and the number of RBs included in the A-type RB group.

In another embodiment, the configuration information further includes a frequency domain range of the CSI fed back by the terminal. A sub-band is used as the frequency domain granularity to represent the frequency domain range of the CSI, and the number of the A-type RB groups included in the sub-band is an integer.

Embodiment 4

Figure 5:
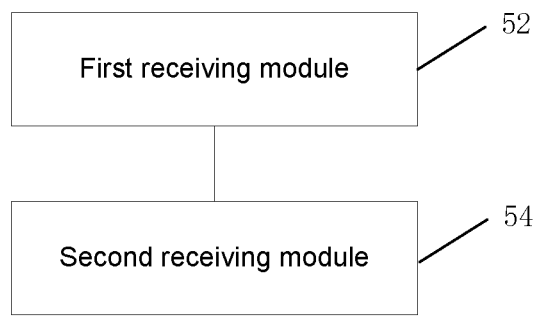
FIG. 5 is a second block diagram of a CSI-RS transmission apparatus according to an embodiment of the present disclosure.

According to another aspect of the embodiments of the present disclosure, a CSI-RS transmission apparatus is also provided. FIG. 5 is a second block diagram of a CSI-RS transmission apparatus according to an embodiment of the present disclosure. As shown in FIG. 5, the apparatus may include: a first receiving module 52 and a second receiving module 54.

The first receiving module 52 is configured to receive the configuration information. The configuration information includes the number of RBs in the A-type RB group, and the A-type RB group comprises the consecutive RBs for carrying all the ports of the CSI-RS.

The second receiving module 54 is configured to receive the CSI-RS according to the configuration information.

The configuration information is further used for indicating one of the following states of the A-type RB group:

the RBs in the A-type RB group are consecutive;

the RBs in the A-type RB group are inconsecutive;

the A-type RB groups are consecutive; and the A-type RB groups are inconsecutive.

In an embodiment, the configuration information also includes the density information of the CSI-RS. The density information of the CSI-RS is used for indicating one of the following states of the A-type RB group:

the RBs in the A-type RB group are consecutive;

the RBs in the A-type RB group are inconsecutive;

the A-type RB groups are consecutive; and the A-type RB groups are inconsecutive.

In another embodiment, the A-type RB groups are equal in spacing or equal in position difference in the frequency domain range of transmitting the CSI-RS.

In another embodiment, the configuration information also includes the density of the A-type RB group which is indicated explicitly or implicitly in the configuration information.

In another embodiment, the density of the A-type RB group is indicated in one of the following ways:

indicating the number of the A-type RB groups in the frequency domain range of transmitting the CSI-RS;

indicating the number of the A-type RB groups which are averaged to a predetermined number of frequency domain units;

indicating a difference in frequency domain position between the adjacent A-type RB groups;

indicating a spacing distance in frequency domain between the adjacent A-type RB groups;

indicating that every M frequency domain RBs have one A-type RB group, M being a positive integer; and indicating that on average, there are N A-type RB groups in the frequency domain range of the size of each A-type RB group, N being a real number.

In another embodiment, the density of the A-type RB group is used for indicating that the A-type RB groups are consecutive or inconsecutive in the frequency domain range of transmitting the CSI-RS.

In another embodiment, the density of the A-type RB group is indicated by indicating the number of the A-type RB groups in the frequency domain range of transmitting the CSI-RS. If the density of the A-type RB group is greater than or equal to a preset threshold, the A-type RB groups are consecutive in the frequency domain range of transmitting the CSI-RS. If the density of the A-type RB group is less than the preset threshold, the A-type RB groups are inconsecutive in the frequency domain range of transmitting the CSI-RS.

In another embodiment, groups of ports of the CSI-RS correspond to the RBs in the A-type RB group one by one.

In another embodiment, the groups of ports correspond to the RBs in the A-type RB group in one of the following ways:
  the sequence number of port of the CSI-RS corresponds to the sequence number of the RB in the A-type RB group;
  the sequence number of port of the CSI-RS corresponds to the frequency of the RB in the A-type RB group;
  the ports with the same remainder obtained by dividing the sequence number of port of the CSI-RS by the number of the RBs in the A-type RB group belong to the same group.

In another embodiment, the configuration information further includes the B-type frequency domain width, which is used for indicating the number of RBs included in the A-type RB group. The B-type frequency domain width includes one of the following:
  the frequency domain width of the CSI fed back by the terminal;
  the frequency domain width of the CSI-RS; and
  the frequency domain width of the bandwidth part of the system.

In another embodiment, the B-type frequency domain width is further used jointly with the adjustment coefficient for indicating the number of RBs included in the A-type RB group. The adjustment coefficient is used for adjusting the number of RBs included in the A-type RB group.

In another embodiment, the configuration information further includes the pre-coded frequency domain granularity fed back by the terminal which is indicated by the number of RBs included in the A-type RB group.

In another embodiment, the pre-coded frequency domain granularity is indicated by the number of RBs included in the A-type RB group in one of the following ways:
  the pre-coded frequency domain granularity is a multiple of the number of RBs included in the A-type RB group;
  the pre-coded frequency domain granularity is equal to the number of RBs included in the A-type RB group;
  the pre-coded frequency domain granularity is determined jointly by the number of RBs included in the A-type RB group and the density of the CSI-RS; and
  the corresponding relationship between the pre-coded frequency domain granularity and the number of RBs included in the A-type RB group.

In another embodiment, the configuration information further includes a frequency domain range of the CSI fed back by the terminal. A sub-band is used as the frequency domain granularity to represent the frequency domain range of the CSI, and the number of the A-type RB groups included in the sub-band is an integer.

It is to be noted that, each of the above modules may be realized by software or hardware. For the latter, the each of the above modules may be realized by, but not limited to, the following way: all of the above modules are in the same processor; or, the above modules are respectively in different processors in form of any combination.

Embodiment 5

The present embodiment also provides a computer-readable storage medium, in which a computer program is stored. The computer program is configured to execute, when running, the steps in any of the above method embodiments.

In the present embodiment, the storage medium may be set to store the computer program for executing the following steps.

At S11, configuration information is transmitted to the terminal, the configuration information including the number of RBs in an A-type RB group, and the A-type RB group comprises the consecutive RBs for carrying all the ports of the CSI-RS.

At S12, the CSI-RS is transmitted to the terminal according to the configuration information.

In the present embodiment, the storage medium may also be configured to store the computer program for executing the following steps.

At S21, configuration information is received, the configuration information including the number of RBs in an A-type RB group, and the A-type RB group comprises the consecutive RBs for carrying all the ports of the CSI-RS.

At S22, the CSI-RS is received according to the configuration information.

In another embodiment, the storage media may include, but not limited to, a USB flash disk, an ROM, an RAM, a mobile hard disk, a magnetic disk, a compact disc, and other media capable of storing the computer program.

Embodiment 6

The present embodiment also provides an electronic device, which includes a memory and a processor. The memory stores a computer program. The processor is configured to run the computer program to execute the steps in any of the above method embodiments.

In an embodiment, the electronic device may also include a transmission device and an input/output device. The transmission device is connected with the processor, and the input/output device is connected with the processor.

In another embodiment, the processor may be configured to execute the following steps through the computer program.

At S11, configuration information is transmitted to the terminal, the configuration information including the number of RBs in an A-type RB group, and the A-type RB group comprises the consecutive RBs for carrying all the ports of the CSI-RS.

At S12, the CSI-RS is transmitted to the terminal according to the configuration information.

In another embodiment, the processor may also be configured to execute the following steps through the computer program.

At S21, configuration information is received, the configuration information including the number of RBs in an A-type RB group, and the A-type RB group comprises the consecutive RBs for carrying all the ports of the CSI-RS.

At S22, the CSI-RS is received according to the configuration information.

The specific examples in the present embodiment may refer to the examples described in the above embodiments and alternative embodiments, and will not be repeated here.

It is apparent that those skilled in the art should appreciate that the above modules and steps of the present disclosure may be implemented by a general-purpose computing device, and they may be centralized in a single computing device or distributed on a network composed of multiple computing devices; optionally, they may be implemented by a program code which is capable of being executed by the computing device, so that they may be stored in a storage device and executed by the computing device; and in some situations, the presented or described steps may be executed in an order different from that described here; or they are made into integrated circuit modules, respectively; or multiple modules and steps of them are made into a single integrated circuit module to realize. Therefore, the present disclosure is not limited to any particular combination of hardware and software.

The above is only the preferred embodiments of the present disclosure and not intended to limit the present disclosure; for those skilled in the art, the present disclosure may have various modifications and changes. Any modifications, equivalent replacements, improvements and the like within the principle of the present disclosure should fall within the protection scope of the claims of the present disclosure.

INDUSTRIAL APPLICABILITY

The embodiments of the present disclosure applied to the communication filed can solve the problem in the related art that system complexity is increased due to the unfixed number of antenna ports for the CSI-RS can be solved, and reduce the system complexity by transmitting the CSI-RS by means of the configuration information that includes the number of RBs included in the A-type RB group, and the A-type RB group comprises the consecutive RBs for carrying all the ports of the CSI-RS.

What is claimed is:

1. A Channel State Information Reference Signal (CSI-RS) transmission method, comprising:
   transmitting configuration information to a terminal, wherein the configuration information comprises the number of Resource Blocks (RB) in an A-type RB group, and the A-type RB group comprises consecutive RBs for carrying all ports of CSI-RS, wherein the A-type RB groups are equal in spacing or equal in position difference in a frequency domain range of transmitting the CSI-RS; and
   transmitting the CSI-RS to the terminal according to the configuration information.

2. The method according to claim 1, wherein
   the configuration information is further used for indicating one of the following states of the A-type RB group:
   the RBs in the A-type RB group are consecutive;
   the RBs in the A-type RB group are inconsecutive;
   the A-type RB groups are consecutive; and
   the A-type RB groups are inconsecutive.

3. The method according to claim 2, wherein
   the configuration information further comprises density information of the CSI-RS; the density information of the CSI-RS is used to indicate one of the following states of the A-type RB group:
   the RBs in the A-type RB group are consecutive;
   the RBs in the A-type RB group are inconsecutive;
   the A-type RB groups are consecutive; and
   the A-type RB groups are inconsecutive.

4. The method according to claim 1, wherein the configuration information further comprises the density of the A-type RB group which is indicated explicitly or implicitly in the configuration information.

5. The method according to claim 4, wherein the density of the A-type RB group is indicated in one of the following ways:
   indicating the number of the A-type RB groups in the frequency domain range of transmitting the CSI-RS;
   indicating the number of the A-type RB groups which are averaged to a predetermined number of frequency domain units;
   indicating a difference in frequency domain position between adjacent A-type RB groups;
   indicating a spacing distance in frequency domain between the adjacent A-type RB groups;
   indicating that every M frequency domain RBs have one A-type RB group, M being a positive integer; and
   indicating that on average, there are N A-type RB groups in the frequency domain range of the size of each A-type RB group, N being a real number.

6. The method according to claim 4, wherein
   the density of the A-type RB group is used for indicating that the A-type RB groups are consecutive or inconsecutive in the frequency domain range of transmitting the CSI-RS.

7. The method according to claim 6, wherein the density of the A-type RB group is indicated by indicating the number of the A-type RB groups in the frequency domain range of transmitting the CSI-RS; if the density of the A-type RB group is greater than or equal to a preset threshold, the A-type RB groups are consecutive in the frequency domain range of transmitting the CSI-RS; if the density of the A-type RB group is less than the preset threshold, the A-type RB groups are inconsecutive in the frequency domain range of transmitting the CSI-RS.

8. The method according to claim 1, wherein
   groups of ports of the CSI-RS correspond to the RBs in the A-type RB group one by one.

9. The method according to claim 8, wherein
   the groups of ports correspond to the RBs in the A-type RB group in one of the following ways:
   the sequence number of port of the CSI-RS corresponds to the sequence number of the RB in the A-type RB group;
   the sequence number of port of the CSI-RS corresponds to the frequency of the RB in the A-type RB group; and
   the ports with the same remainder which is obtained by dividing the sequence number of port of the CSI-RS by the number of RBs in the A-type resource block group.

10. The method according to claim 1, wherein
    the configuration information further comprises: a B-type frequency domain width, which is used for indicating the number of RBs comprised in the A-type RB group; the B-type frequency domain width comprises one of the following:
    a frequency domain width of Channel State Information (CSI) fed back by the terminal;
    a frequency domain width of the CSI-RS; and
    a frequency domain width of a bandwidth part of a system.

11. The method according to claim 10, wherein
    the B-type frequency domain width is further used jointly with an adjustment coefficient for indicating the number of RBs comprised in the A-type RB group; the adjustment coefficient is used for adjusting the number of RBs comprised in the A-type RB group.

12. The method according to claim 1, wherein
the configuration information further comprises a pre-coded frequency domain granularity fed back by the terminal which is indicated by the number of RBs comprised in the A-type RB group.

13. The method according to claim 12, wherein
the pre-coded frequency domain granularity is indicated by the number of RBs comprised in the A-type RB group in one of the following ways:
the pre-coded frequency domain granularity is a multiple of the number of RBs comprised in the A-type RB group;
the pre-coded frequency domain granularity is equal to the number of RBs comprised in the A-type RB group;
the pre-coded frequency domain granularity is determined jointly by the number of RBs comprised in the A-type RB group and the density of the CSI-RS; and
a corresponding relationship between the pre-coded frequency domain granularity and the number of RBs comprised in the A-type RB group.

14. The method according to claim 1, wherein
the configuration information further comprises a frequency domain range of the CSI fed back by the terminal; a sub-band is used as the frequency domain granularity to represent the frequency domain range of the CSI, and the number of the A-type RB groups comprised in the sub-band is an integer.

15. A Channel State Information Reference Signal (CSI-RS) transmission method, comprising:
receiving configuration information, wherein the configuration information comprises the number of Resource Blocks (RB) in an A-type RB group, and the A-type RB group comprises consecutive RBs for carrying all ports of CSI-RS, wherein the A-type RB groups are equal in spacing or equal in position difference in a frequency domain range of transmitting the CSI-RS; and
receiving the CSI-RS according to the configuration information.

16. The method according to claim 15, wherein
the configuration information is further used for indicating one of the following states of the A-type RB group:
the RBs in the A-type RB group are consecutive;
the RBs in the A-type RB group are inconsecutive;
the A-type RB groups are consecutive; and
the A-type RB groups are inconsecutive.

17. A non-transitory computer-readable storage medium, in which a computer program is stored, wherein the computer program is configured to execute, when running, the method according to claim 1.

18. An electronic device, comprising a memory and a processor, wherein the memory stores a computer program, and the processor is configured to run the computer program to execute the method according to claim 15.

* * * * *